United States Patent
Guigues

(10) Patent No.: US 10,489,892 B2
(45) Date of Patent: Nov. 26, 2019

(54) METHOD FOR SIGNAL PROCESSING

(71) Applicant: Sony Depthsensing Solutions SA/NV, Brussels (BE)

(72) Inventor: Laurent Guigues, Brussels (BE)

(73) Assignee: Sony Depthsensing Solutions SA/NV, Brussels (BE)

( * ) Notice: Subject to any disclaimer, the term of this patent is extended or adjusted under 35 U.S.C. 154(b) by 0 days.

(21) Appl. No.: 15/739,482

(22) PCT Filed: Jun. 20, 2016

(86) PCT No.: PCT/EP2016/064185
§ 371 (c)(1),
(2) Date: Dec. 22, 2017

(87) PCT Pub. No.: WO2017/001227
PCT Pub. Date: Jan. 5, 2017

(65) Prior Publication Data
US 2018/0322616 A1    Nov. 8, 2018

(30) Foreign Application Priority Data
Jun. 30, 2015   (EP) ..................................... 15174505

(51) Int. Cl.
*G06T 5/00* (2006.01)
(52) U.S. Cl.
CPC .... *G06T 5/002* (2013.01); *G06T 2207/10028* (2013.01); *G06T 2207/20012* (2013.01); *G06T 2207/20192* (2013.01)

(58) Field of Classification Search
CPC ........... G06T 5/002; G06T 2207/20192; G06T 2207/10028; G06T 2207/20012
(Continued)

(56) References Cited

U.S. PATENT DOCUMENTS

2008/0123984 A1*  5/2008  Xie ........................... G06T 5/20
                                                                 382/254
2012/0200747 A1   8/2012  Higuchi
(Continued)

OTHER PUBLICATIONS

International Search Report and Written Opinion for International Application No. PCT/EP2016/064185 dated Sep. 8, 2016.
(Continued)

*Primary Examiner* — Jerome Grant, II
(74) *Attorney, Agent, or Firm* — Wolf, Greenfield & Sacks, P.C.

(57) ABSTRACT

Described herein is a method for signal processing in which noise in an input signal comprising an intensity which is a function of at least a first coordinate and a second coordinate. A noise reduction or de-noising process is applied to the input signal in respect of the first coordinate to generate an intermediate de-noised signal. A second noise reduction or de-noising process is applied to the intermediate de-noised signal in respect of the second coordinate to generate an output de-noised signal. For each coordinate, noise reduction processes are applied in two directions, the results of these processes being averaged to provide the de-noised signals. Weighting is applied in accordance with the detection of an edge within the signal used as input in the de-noising process.

17 Claims, 8 Drawing Sheets

(58) Field of Classification Search
USPC .......................................................... 382/264
See application file for complete search history.

(56) References Cited

U.S. PATENT DOCUMENTS

2018/0322614 A1* 11/2018 Petrova ................. G06T 3/4076
2019/0019272 A1*  1/2019 Chuang ................. G06T 5/002
2019/0079410 A1*  3/2019 Geypen ............... G03F 7/70141

OTHER PUBLICATIONS

Cigla et al., An efficient recursive edge-aware filter. Signal Processing: Image Communication 2014;29:998-1014.
Cigla et al., Efficient edge-preserving stereo matching. IEEE International Conference on Computer Vision Workshops. 2011:696-99.
Smith, Chapter 19—Recursive Filters. The Scientist and Engineer's Guide to Digital Signal Processing. 1997. 14 pages.
Thevenaz et al., Bi-Exponential Edge-Preserving Smoother. IEEE Transactions on Image Processing. 2012;21(9):3924-36.

* cited by examiner

METHOD FOR SIGNAL PROCESSING

The present application is a National Stage application of PCT/EP2016/064185, filed on Jun. 20, 2016, which claims priority to European Patent Application 15174505.6, filed on Jun. 30, 2015, the entire contents of each of which is incorporated herein by reference.

FIELD OF THE INVENTION

The invention relates to a method for signal processing, and is more specifically related to the removal of noise from a signal.

BACKGROUND OF THE INVENTION

Signals are often a combination of a wanted meaningful signal and unwanted distortion, generally referred to as noise, which can be generated during capture, storage, transmission, processing, or conversion of the signal. Many noise-removal, noise reduction or de-noising, techniques exist. Since noise is typically at higher frequencies than the meaningful signal, the de-noising techniques usually employ low-pass filters for removing high frequency components of the signal thereby maintaining the wanted and meaningful signal.

Auto-regressive filter techniques are known for de-noising. Such techniques require that the signal is processed coordinate by coordinate; for each coordinate, the signal is processed direction by direction; and for each direction, the signal is processed point by point. The output of the noise reduction or de-noising process, in one coordinate and one direction, of a point depends on the intensity of the signal at that point and on the output of the de-noising at the previous points along that one direction of that one coordinate. The output values for the de-noising in all directions for a first coordinate are then averaged to provide the de-noised signal for the first coordinate. If the signal is function of a second coordinate, the de-noised signal for the first coordinate is then used as an input signal in a de-noising step for the second coordinate and used to provide the de-noised signal for the first and second coordinates. If the signal is function of a third coordinate, the noise reduction or de-noising process is repeated, coordinate by coordinate.

For example, if the signal has a parameter X as function of a coordinate i, X(i), the values of i are first considered in increasing order (first direction) and then in decreasing order (second direction). In the first direction, the output L of the noise reduction or de-noising process with respect to the point i, L(i) depends on X(i) and on L(i−1):

$$L(i)=\text{function}[X(i), L(i-1)]$$

In the second direction, the output R of the noise reduction or de-noising process with respect to the point i, R(i) depends on X(i) and on R(i+1):

$$R(i)=\text{function}[X(i), R(i+1)]$$

The overall output O of the noise reduction or de-noising process at point i is:

$$O(i)=(L(i)+R(i))/2$$

The above example corresponds to a first order filter, where the value L(i) computed at point i only depends on the value of the input signal at point i and of the value L(i−1) computed at coordinate i−1. More generally, the result L(i) of an order N filter would depend on values of L at coordinates L(i−1), L(i−2) . . . L(i−N).

One problem with the majority of de-noising techniques, including the auto-regressive filter technique, is that they alter the high frequency components, that is the edges, in the wanted meaningful signal. For example, they transform a sharp edge in an image having a sharp change of colour between two adjacent pixels into a blurry zone which is several pixels wide and having an intermediate colour. Edges are extremely important in the visual appearance of images, and edge alteration is not acceptable in the medical imaging domain for example.

When the signal to be de-noised is a depth map with foreground regions having small depth values due to being closer to the imaging system and background regions having greater depth values due to being further away from the imaging system than the foreground regions, a typical drawback of a filtering process is that pixels close to the edges between foreground and background regions are set by the filtering process to depth values which are intermediate a typical background depth value and a typical foreground depth value for the depth map. Pixels having these intermediate depth values may be erroneously classified as belonging to foreground regions and/or background regions.

However, several de-noising techniques that preserve edges already exist. Bilateral filtering is one such de-noising technique that preserves edges by using intensity values. The intensity value at a point is replaced by an average of intensity values of points selected such that, first, the points are close according to at least one variable on which the signal depends, and, secondly, the intensity values of the signal at these points are also close.

Total variation de-noising is another de-noising technique that preserves edges in a signal by determining a minimum of an integral involving the absolute gradient of the signal.

Anisotropic diffusion de-noising technique also preserves edges in a signal by using filters which depend on the local intensity of the signal.

However, these three edge-preserving de-noising techniques are very demanding from a computational point of view. When the signal comes from a camera that records 60 RGB images of 320×240 pixels per second, the computer has to perform noise reduction or de-noise 60*320*240*3>130,000,000 pixels each second. This is why, for example in video image processing, it is extremely important to reduce the number of steps a computer has to perform to de-noise the image, while still performing a satisfactory removal of the noise.

There is therefore a need for a noise reduction or de-noising technique capable of performing substantial noise removal on a signal whilst preserving the edges of the signal and keeping the number of required computational steps low.

The articles by Cigla Cevahir et al. entitled "An efficient recursive edge-aware filter" from (Signal Processing: Image Communication, Elsevier Science Publishers, Amsterdam, N L, vol. 29, no. 9, 30 Jul. 2014, pages 998-1014) and "Efficient edge-preserving stereo matching" (IEEE International Conference on Computer Vision Workshops, IEEE, 6 Nov. 2011, pages 696-699) disclose a method for denoising that preserves edges. This known method involves a calculation of a left-to-right component and of a right-to-left component which both involve a weight that accounts for edges. The left-to-right and right-to-left components are then summed.

The article "Bi-Exponential Edge-Preserving Smoother" by Philippe Thevenaz et al (IEEE Transactions on Image Processing, IEEE Service, vol. 21, no. 9, 1 Sep. 2012, pages 3924-3936) discloses an edge-preserving smoother. This known method also involves a calculation of a left-to-right component and of a right-to-left component which both involve a weight that accounts for edges. The left-to-right and right-to-left components are then summed.

US-A-2012/0200747 discloses an image signal processing method wherein a first smoothed signal processing unit generates a first smoothed signal using an averaging filter, and a second smoothed signal processing unit generates a second smoothed signal using a bilateral filter. A mixing processing unit mixes the first smoothed signal that is input from the first smoothed signal creating unit and the second smoothed signal that is input from the second smoothed signal creating unit in accordance with predetermined mixing ratios. The mixing ratio is determined in such a manner that, in a bright portion, the mixing ratio of the second smoothed signal, which is the smoothed image signal in which edges are maintained, is high, whereas, in a dark portion, the mixing ratio of the first smoothed signal, which is a blur-emphasized smoothed image signal, is high.

SUMMARY OF THE INVENTION

It is therefore an object of the present invention to provide a signal processing method capable of performing substantial noise removal for a signal whilst preserving edges in the signal at low computational cost. In accordance with one aspect of the present invention, there is provided a method for decreasing noise from an input signal to generate a de-noised signal, the input signal comprising an intensity which is a function of at least one coordinate, the method comprising the steps of:

a) applying a first noise reduction process to the input signal in a first direction along a first coordinate to generate a first component of the de-noised signal;

b) applying a second noise reduction process to the input signal in a second direction along the same coordinate to generate a second component of the de-noised signal, the first and second directions being opposite to one another; and c) detecting the presence of an edge in signal intensity in the input signal within the neighbourhood of a given point and averaging at least the first and second components to generate a de-noised signal;

characterised in that step c) further comprises:

applying a weighting to at least one of the first and second components if an edge is detected at the given point, the weighting being adjusted in accordance with to which side of the point the detected edge lies, and applying the same weighting to each of the first and the second components if no edge is detected at the given point.

By applying two noise reduction processes to the same input signal and then averaging the two de-noised signals, it is possible to perform substantial noise removal from the input signal with low computational cost.

Step c) may further comprise giving more weight to one of the first and second components than to the other one of the first and second components when the detected edge is on the side of the point opposite to the one of the first and second components.

Step c) may further comprise determining the weighting at a given point at which the input signal has an intensity in accordance with signal intensity in the input signal in the neighbourhood of the given point.

Alternatively, or in addition to, step c) may comprise determining the weighting at a given point at which the input signal has an intensity in accordance with a variation in signal intensity in the input signal in the neighbourhood of the given point.

Step c) may comprise determining the weighting at a given point at which the input signal has an intensity in accordance with signal intensity in the input signal in the neighbourhood of the point.

Alternatively, or in addition to, step c) may comprise determining the weighting at a given point at which the input signal has an intensity in accordance with a variation in signal intensity in the input signal in the neighbourhood of the point.

The weighting may be adjusted to give more weight to one of the first and second components than to the other one of the first and second components when the detected edge is on the side of the point opposite to the one of the first and second components.

This means that if the detected edge is located on the right of a given point, the weighting is adjusted for the component de-noised signal on the left of the point, and vice versa. Adjusting the weighting in this way ensures that a sharp edge is maintained during noise reduction of the input signal.

The maintenance of a sharp edge is particularly preferable where the input signal comprises a depth map and the edge is at the boundary between a foreground region and a background region.

In one embodiment, step a) comprises applying the first noise reduction process in a first direction along a first coordinate, and step b) comprises applying the second noise reduction process in a second direction along the same coordinate, the first and second directions being opposite to one another.

For at least one point, a contribution of the first component to the weighting is increased in accordance with an absolute value of the difference between an intensity of the input signal at the point and an intensity of the second component at another point further along the first coordinate.

Similarly, for at least one point, a contribution of the second component to the weighting may be increased in accordance with an absolute value of the difference between an intensity of the input signal at the point and the intensity of the first component at a previous point along the first coordinate.

In one embodiment, the first and second noise reduction processes are performed by auto-regressive filtering techniques.

A noise reduction process may also be applied to at least one weighting for the first and second components. This noise reduction process may be performed by an auto-regressive filtering technique.

An embodiment of the invention comprises a method for decreasing noise from an input signal to generate a de-noised signal for first and second coordinates, the input signal comprising an intensity which is a function of at least the first coordinate and the second coordinate, and wherein the method comprises decreasing noise from the input signal with respect of the first coordinate in accordance with the invention, and generating a first coordinate de-noised signal, the method further comprising, for the second coordinate, performing the steps of:

i) applying a first noise reduction process on the first coordinate de-noised signal to generate a first component of the de-noised signal for the first and second coordinates;

ii) applying a second noise reduction process on the first coordinate de-noised signal to generate a second component of the de-noised signal for the first and second coordinates; and iii) averaging the first and second components for the first and second coordinates to generate a de-noised signal for the first and second coordinates, the averaging of the first and the second components for the first and second coordinates comprising applying a weighting.

When the input signal comprises an intensity which is a function of at least two coordinates, the noise can be decreased by applying the method described above for the first coordinate to generate a first coordinate de-noised signal, and a similar method for the second coordinate on its output.

In one embodiment, the input signal comprises a depth map, and the first and second coordinates respectively comprise a horizontal coordinate and a vertical coordinate. In this case, the horizontal and vertical components define an array of points, each point having an intensity in the form of a depth value.

In accordance with another aspect of the present invention, there is provided an interactive computerised system comprising:
  an imaging system for capturing at least one image of a scene within its frustum; and
  a computerised system associated with the imaging system, the computerised system including at least one processor for processing at least one captured image of the scene in accordance with the steps according to any one of the preceding claims.

In one embodiment, the imaging system comprises a depth sensing imaging system.

In accordance with a further aspect of the present invention, there is provided a non-transitory computer readable medium storing a program for causing a computer to execute the steps of the method as described above.

In one embodiment, programming instructions are grouped in order to minimise the number of computational loops.

BRIEF DESCRIPTION OF THE DRAWINGS

For a better understanding of the present invention, reference will now be made, by way of example, to the accompanying drawings in which.

DESCRIPTION OF THE INVENTION

Figure 1:
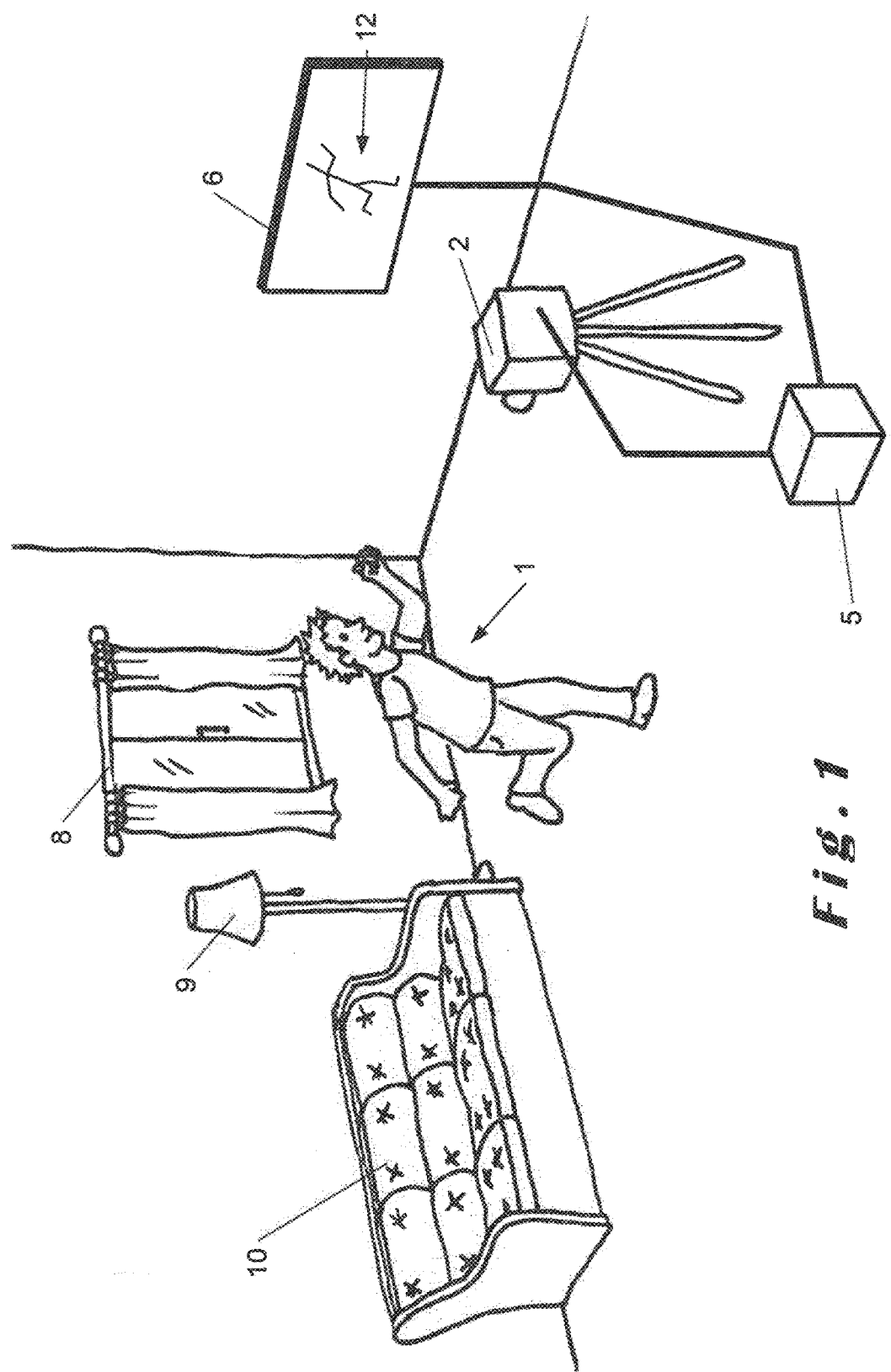
FIG. 1 illustrates a room with a human being in front of an imaging system connected to a computerised system which is capable of performing an image processing method according to an embodiment of the present invention.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

In the following description, an element described with reference to one figure which is identical to elements in other figures is referred to by the same reference numeral.

As used herein, the term "signal" is intended to refer to a parameter that is function of at least one other parameter, for example, an intensity of a signal with respect to time or a depth map with respect to elements in an array.

As used herein, the term "point" is intended to refer to a multi-dimensional coordinate in multi-dimensional space on which a signal depends.

As used herein, the term "coordinate" is intended to refer to a parameter of which the signal is a function. Coordinates are sometimes referred to as being independent variables, whilst the signal is referred to as being a dependent variable. The number of coordinates for a specific point in a signal is equal to the number of dimensions. For example, a point may have two coordinates in two-dimensional space and the signal at that point is dependent on those two coordinates, that is, an x- and a y-coordinate relative to respective x- and y-axes.

As used herein, the term "intensity" is intended to refer to the value of the signal.

As used herein, the term "edge" is intended to refer to a large change in the signal intensity as function of at least one coordinate, for example, in one direction or dimension, the change being spread over a range of values in the direction or dimension. Some examples of a signal and its coordinate(s) (shown in parentheses) include:
  an electrical signal at a point in an electrical circuit (time),
  a grayscale image (horizontal position, vertical position),
  a depth image or depth map (horizontal position, vertical position),
  a temperature in a room as function of the time (horizontal position, vertical position, depth value, time),
  a mass spectrum (ratio mass over charge).

One possible implementation of the method for decreasing the noise in a signal in accordance with the present invention can be used with a gesture recognition system associated with an interactive computer or computerised system as shown in FIG. 1. A user interacts with a three-dimensional (3D) imaging system to control an interactive computer or computerised system using gestures performed in front of the imaging system.

In this case, the method for decreasing the noise in a signal is used for processing of a depth image captured by the 3D imaging system. The depth image is then used in the recognition of the gestures of a human user 1 in the field of view of an imaging system 2 in order to interact with a computer 5, the computer 5 generating a visual feedback 12 for display on a screen 6 to the human user 1. The field of view of the 3D imaging system 2 also comprises also a window 8, a lamp 9 and a sofa 10.

The 3D imaging system 2 captures depth images of the scene within its field of view, the depth images being processed and used for interaction with the computer 5. The computer 5 processes at least one image captured by the 3D imaging system 2 to determine foreground and background regions within the scene, foreground regions typically corresponding to objects of interest which may be used for gesture recognition, and, background regions corresponding to pixels which are not associated with objects of interest. In the specific case illustrated in FIG. 1, the foreground region comprises the pixels corresponding to the human user 1 which are processed for gesture recognition so that the human user 1 can interact with the computer 5 without the need for additional devices. The pixels of the human user have lower depth values when compared to the other elements in the scene as they are nearer to the imaging system 2. The window 8, the lamp 9 and the sofa 10, in the case of FIG. 1, form part of the background region as pixels of these items have higher depth values than the pixels of the human user 1, that is, the pixels are further away from the 3D imaging system 2 than the human user 1.

In FIG. 1, processing of a series of images in a video sequence captured by the 3D imaging system 2 by the computer 5 results in a visual sequence 12 which is displayed on the display or screen 6 connected to the computer 5 to provide visual feedback to the human user 1 in a suitable form. The computer 5 performs gesture recognition for interpreting gestures of the human user 1, which makes possible for the human user 1 to interact naturally with the computer 5 without mechanical devices.

Figure 2:
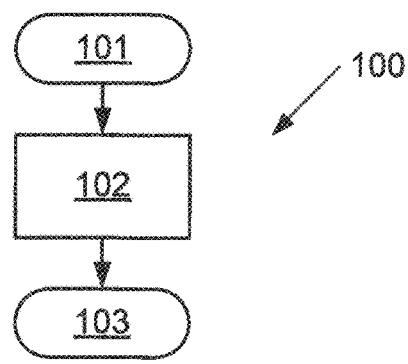
FIG. 2 illustrates a flow chart of steps for a generic noise reduction process.

In FIG. 2, a flowchart is shown which illustrates a noise reduction or de-noising process 100 in which an input noisy signal 101 is processed in step 102 to provide a de-noised signal 103 from the input noisy signal 101.

It will be appreciate that, although the present invention will be described hereafter referring mainly to an embodiment where the signal is a depth image, that is, a depth value as function of associated horizontal and vertical coordinates, the present invention may be applied to any signal function comprising any number of coordinates.

Figure 3:
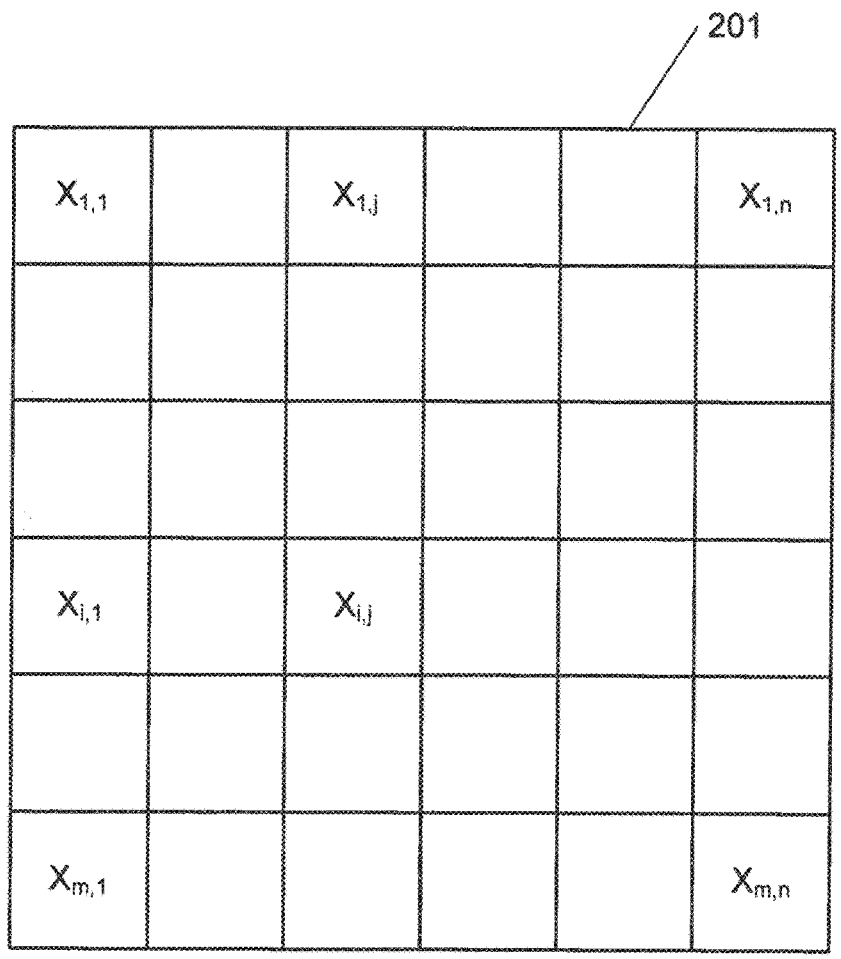
FIG. 3 illustrates an input signal or image which comprises an array of elements.

In an embodiment of the invention, the noisy signal 101 may comprise a noisy image 201 as shown in FIG. 3. The noisy image 201 comprises an array X of m×n pixels in which the pixel of the first row and first column has a depth value of $X_{1,1}$; the pixel of the last row and last column has a depth value of $X_{m,n}$, and, more generally, the pixel of the $i^{th}$ row and the $j^{th}$ column has a depth value $X_{i,j}$.

Figure 4:
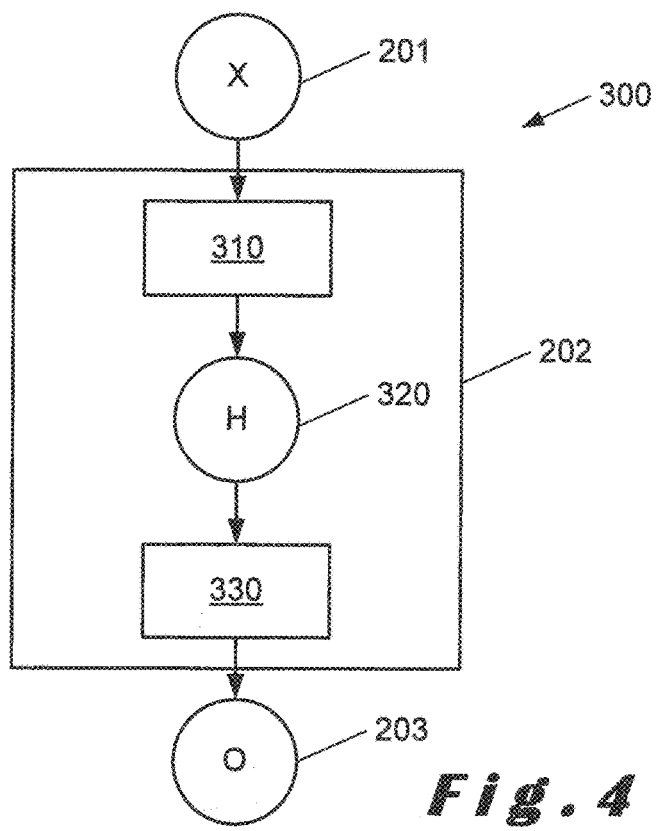
FIG. 4 illustrates a flow chart showing steps for a two-dimensional noise reduction process for an input signal or image.

In FIG. 4, a flow chart is shown which illustrates the steps for a noise reduction or de-noising process 300 in which a de-noised image 203 is created from a noisy image 201 in a two-dimensional noise reduction or de-noising process 202. In the two-dimensional noise reduction or de-noising process 202, the noisy image 201 is taken as input for the horizontal coordinate 310, and the noise reduction or de-noising process generates, as output 320, a de-noised image for the horizontal coordinate. Then, the de-noised image for the horizontal coordinate 320 is taken as input for the noise reduction or de-noising process for the vertical coordinate 330, the noise reduction or de-noising process 202 generating, as output, the de-noised image 203.

The noisy image 201, the de-noised image 203 and the image de-noised for the horizontal coordinate 320 are two-dimensional images. The de-noised image for the horizontal coordinate 320 is an array H of m×n pixels wherein a pixel of the $i^{th}$ row and the $j^{th}$ column has a depth value $H_{i,j}$. The de-noised image 203 is an array O of m×n pixels in which a pixel of the $i^{th}$ row and the $j^{th}$ column has a depth value $O_{i,j}$. The noise reduction or de-noising process for the horizontal coordinate 310 will be described in more detail with the reference to FIG. 5 and the noise reduction or de-noising process for the vertical coordinate 330 will be described in more detail with reference to FIG. 6.

Figure 5:
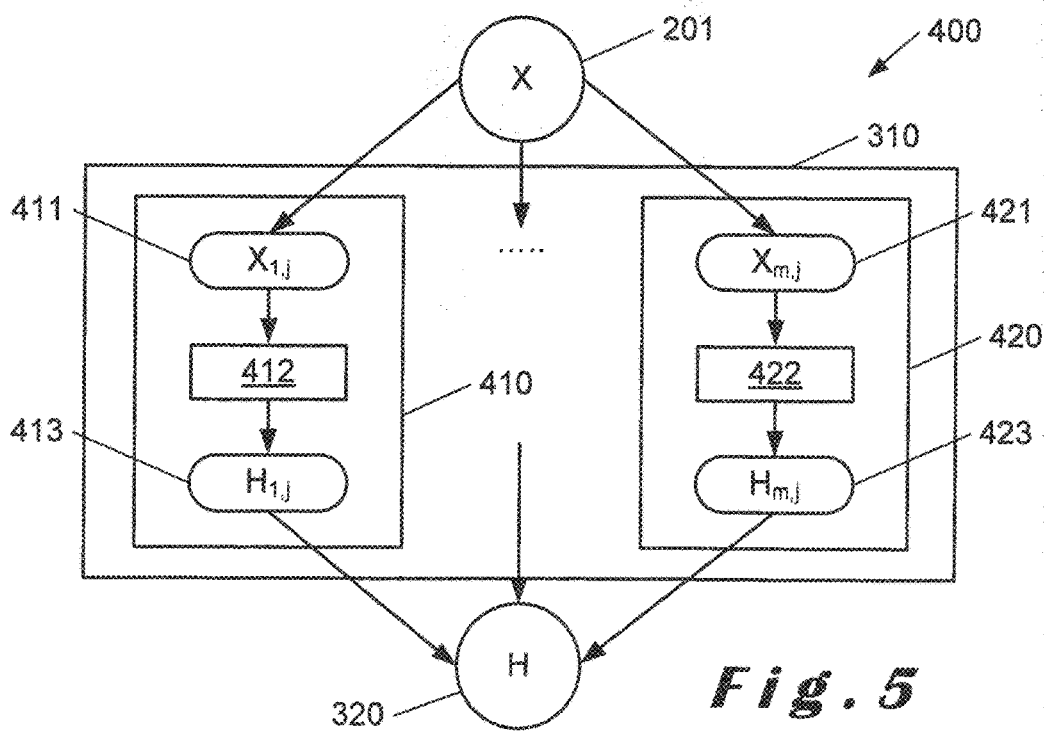
FIG. 5 illustrates a flow chart showing steps for creating a de-noised image for horizontal coordinates of an input signal or image as shown in FIG. 3.

In FIG. 5, a flow chart 400 is shown which illustrates the steps for creating the de-noised image for the horizontal coordinates 320 of the noisy image 201 by applying the noise reduction or de-noising process in accordance with the present invention to the horizontal coordinates 310.

In the noise reduction or de-noising process for the horizontal coordinates 310, a first row 411 of the noisy image 201, which has elements $X_{1,j}$, is first considered, in a first row noise reduction or de-noising step 410. The first row 411 of the noisy image 201 is an input, also called input signal, for the noise reduction or de-noising process 412 for the first row. The output of the noise reduction or de-noising process 412 provides a first row 413 of the de-noised image for the horizontal coordinates of the first row, which has elements $H_{1,j}$, j having integer values from 1 to n.

In the noise reduction or de-noising process for the horizontal coordinates 310, the subsequent rows are then similarly processed in noise reduction or de-noising steps (not shown) until a final noise reduction or de-noising step 420 for a last row 421 of the noisy image 201, which has elements $X_{m,j}$. The last row 421 of the noisy image 201 is an input for the noise reduction or de-noising process 422 of the last row, which provides a last row 423 of the de-noised image for the horizontal coordinates, which has elements $H_{m,j}$. The noise reduction or de-noising process 412 for a first row and the noise reduction or de-noising process 422 for a last row 422, will be described in more detail with reference to FIG. 7.

The combination of all the rows of the de-noised image for the horizontal coordinates, $H_{1,j}, \ldots, H_{m,j}$, form the de-noised image H for the horizontal coordinate 320.

It will be appreciated that, although the present invention is described using the first row 411 of the noisy image 201, the methods described herein can be applied to any row, column or series of data. More specifically, in an embodiment of the invention, the methods described here using the first row 411 of the noisy image 201 are used for the other rows and for the columns of the noisy image as will be described in more detail below.

Figure 6:
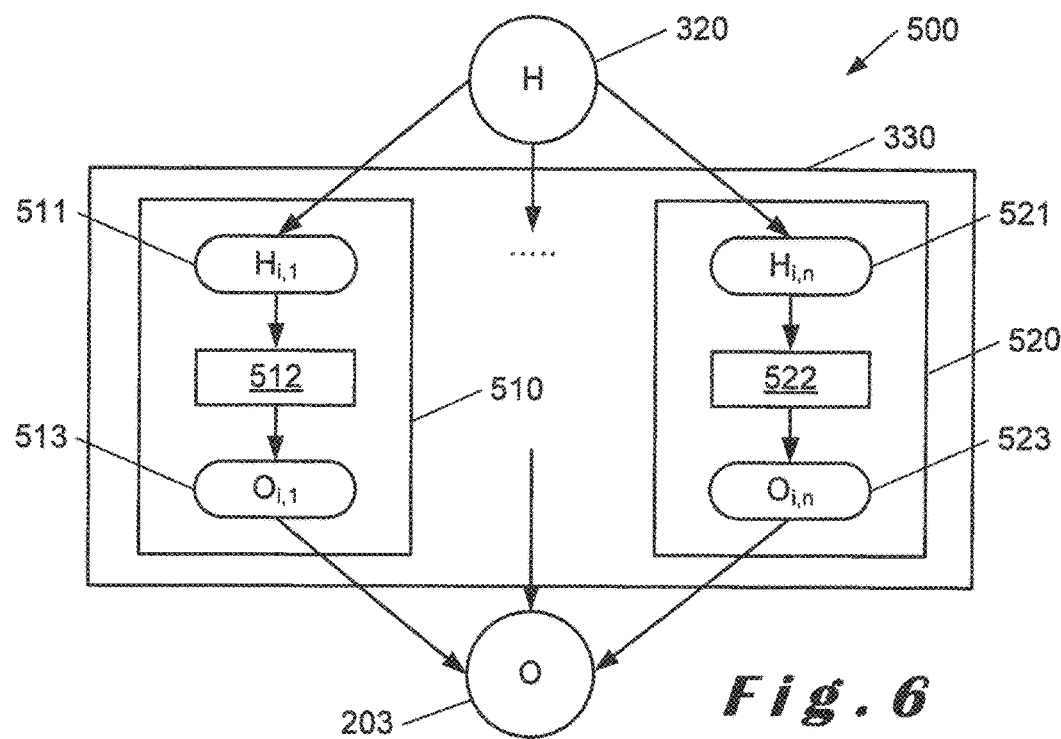
FIG. 6 illustrates a flow chart showing steps for creating a de-noised image for vertical coordinates using the de-noised signal or image for the horizontal coordinates as the input signal or image.

In FIG. 6, a flow chart 500 is shown which illustrates the steps for creating the de-noised image 203 O from the de-noised image H (shown as 320) for the horizontal coordinate for the noise reduction or de-noising process 330 for the vertical coordinates of the m×n image array described above.

In the noise reduction or de-noising process for the vertical coordinate 330, a first column 511 of the de-noised image 320 for the horizontal coordinate is first considered for the noise reduction or de-noising process 510, the first column 511 having elements $H_{i,1}$. The first column 511 of the de-noised image 320 forms an input, i.e. an input signal, for the noise reduction or de-noising process 512, which provides a first column 513 of the de-noised image, which has elements $O_{i,1}$, where i has an integer value between 1 and m.

In the noise reduction or de-noising process for the vertical coordinates 330, the subsequent columns are then similarly de-noised, until the last column 521 of the de-noised image 320, which has elements $H_{i,n}$. The last column 521 of the de-noised image 320 forms an input for the noise reduction or de-noising process 522 of the last column to provide a last column 523 of the de-noised image, which has elements $O_{i,n}$, where i has an integer value between 1 and m as described above.

The combination of all the columns of the de-noised image, $O_{i,1}, \ldots, O_{i,n}$, form the de-noised image 203. The noise reduction or de-noising process 512 for a first column and the noise reduction or de-noising process 522 for a last column will be described in more detail with reference to FIG. 8.

Figure 7:
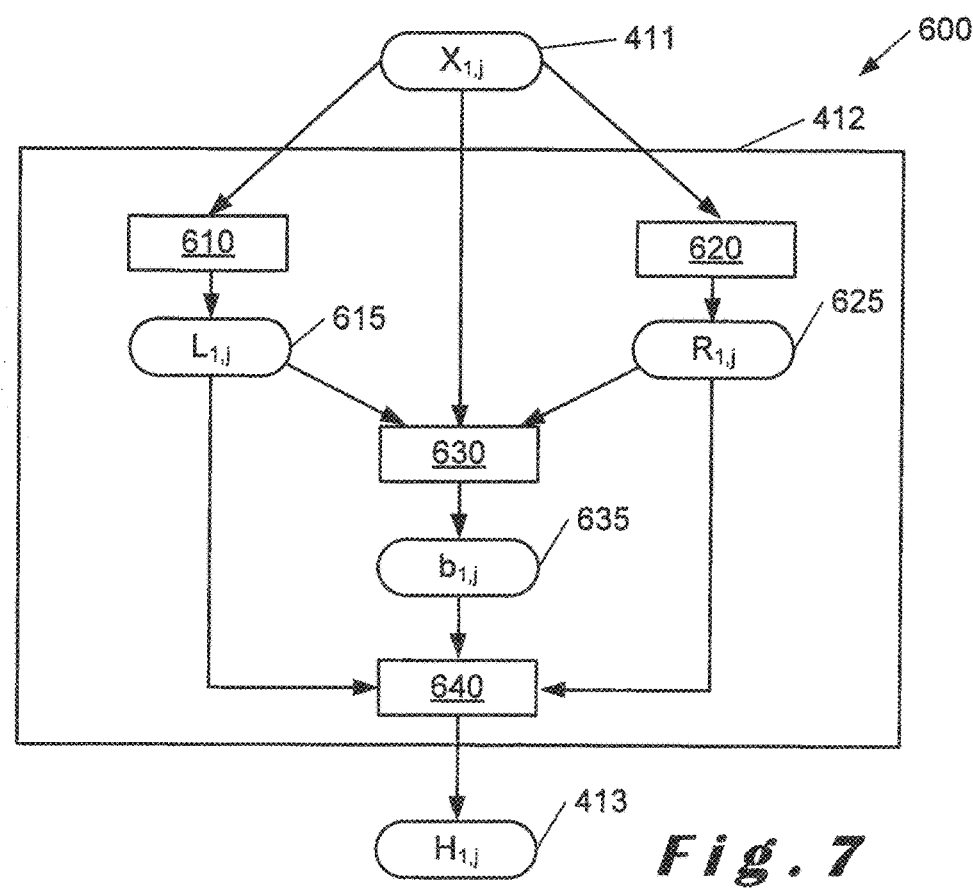
FIG. 7 illustrates a flow chart showing steps for noise reduction for a first row of the array shown in FIG. 3.

In FIG. 7, a flow chart 600 is shown which illustrates the steps for creating a first row 413 of the de-noised image from the first row 411 of the noisy image by the noise reduction or de-noising process 412 according to an embodiment of the invention. The first row 411 of the noisy image, $X_{1,j}$, (referred to as 201 in FIGS. 4 and 5 described above) forms an input for a left-to-right noise reduction or de-noising process 610, which generates a left-to-right de-noised first row 615, $L_{1,j}$. The first row 411 of the noisy image, $X_{1,j}$, also forms an input for a right-to-left noise reduction or de-noising process 620, which generates a right-to-left de-noised first row 625, $R_{1,j}$. A weight calculation process 630 uses the left-to-right de-noised first row 615, $L_{1,j}$, and the right-to-left de-noised first row 625, $R_{1,j}$, as well as the first row 411 of the noisy image as inputs and generates weights 635 for the first row, $b_{1,j}$.

It will readily be appreciated that the weight calculation process 630 may use inputs other than the first row 411 of the noisy image, the left-to-right de-noised first row 615, $L_{1,j}$, and the right-to-left de-noised first row 625, $R_{1,j}$, in accordance with a particular implementation of the present invention.

The left-to-right de-noised first row 615, the right-to-left de-noised first row 625 and the weights 635, $b_{1,j}$, for the first row 635 form inputs for a weighted averaging process 640, which generates the first row 413 of the de-noised image, $H_{1,j}$, for the horizontal coordinates.

In an embodiment of the invention, the left-to-right noise reduction or de-noising process 610 is performed with a first order auto-regressive filtering technique. The first element of the left-to-right de-noised first row 615, $L_{1,1}$, is given a value, which may be equal to the value of the signal at that point, $X_{1,1}$, an average of the signal over the first two points $(X_{1,1}+X_{1,2})/2$ or any other suitable value. For j, where j is an integer between 2 and n, the $j^{th}$ element of the left-to-right de-noised first row 615, $L_{1,j}$, is computed as $$L_{1,j}=(1-a_L)X_{1,j}+a_L L_{1,(j-1)} \quad (1)$$

where $a_L$ is a positive number in the range from 0 to 1, and including both 0 and 1, and $L_{1,(j-1)}$ is the $(j-1)^{th}$ element of the left-to-right de-noised first row 615. Higher order auto-regressive filtering techniques may also implemented depending on the particular implementation of the present invention.

In an embodiment of the invention, the right-to-left noise reduction or de-noising process 620 is also performed with an auto-regressive filtering technique. The last element of the right-to-left de-noised first row 625, $R_{1,n}$, is given a value, which may be equal to the value of the signal at that point, $X_{1,n}$, or an average of the signal over the last two points $(X_{1,n}+X_{1,(n-1)})/2$ or any other suitable value. For j, taking all integer values from (n−1) to 1, the $j^{th}$ element of the right-to-left de-noised first row 625, $R_{1,j}$, is computed as $$R_{1,j}=(1-a_R)X_{1,j}+a_R R_{1,(j+1)} \quad (2)$$

where $a_R$ is a positive number in the range from 0 to 1, and including both 0 and 1, and $R_{1,(j+1)}$ is the $(j+1)^{th}$ element of the right-to-left de-noised first row 625. In one embodiment, $a_R$ may be equal to $a_L$.

It will be readily appreciated that other noise reduction or de-noising techniques, especially auto-regressive filtering techniques in which the output of the noise reduction or de-noising process at a point depends on the value of the signal at that point and on the output of the noise reduction or de-noising process at previously processed points, may be applied for the left-to-right noise reduction or de-noising process and the right-to-left noise reduction or de-noising process.

In an embodiment of the invention, the weight calculation process 630 for the determination of the weights 635 is such that the value of the weight at a point depends on the presence of an edge in a neighbourhood of this point. If an edge is detected at the right of a point, then the weight for this point is such that the influence of the left-to-right de-noised signal with respect to the right-to-left de-noised signal is significant. Similarly, if an edge is detected at the left of a point, then the weight for this point is such that the influence of the left-to-right de-noised signal with respect to the right-to-left de-noised signal is less significant. Embodiments of weight calculation process 630 will be described in more detail below.

The terms "significant" and "less insignificant" as used herein are intended to indicate the influence of the left-to-right de-noised signal in the determination of the weight which is applied. The term "significant" indicates a high influence and the term "less significant" indicates a lower influence and these two terms can be considered to be relative terms.

The number of weights 635 for the first row is equal to the number of elements of the first row, that is, n. The weights are used to weight the contributions of the left-to-right de-noised first row 615 and the right-to-left de-noised first row 625 in the first row 413 of the de-noised image 320 for the horizontal coordinates. The weighted averaging process 640 may be written as $$H_{1,j}=b_{1,j}L_{1,j}+(1-b_{1,j})R_{1,j} \quad (3)$$

The left-to-right de-noised first row 615, $L_{1,j}$, can therefore be seen as a first component of de-noised signal and the right-to-left de-noised first row 625, $R_{1,j}$, can therefore be seen as a second component of de-noised signal, the de-noised signal being here the first row 413 of the de-noised image, $H_{1,j}$, for the horizontal coordinates.

In an embodiment of the invention, if an edge is detected at the right of a point, then the left-to-right de-noised signal is favoured in the weighted averaging process to provide a large value for $b_{1,j}$ for that point. Similarly, if an edge is detected at the right of a point, then the right-to-left de-noised signal is favoured in the weighted averaging process to provide a small value for $b_{1,j}$ for that point.

The terms "large" and "small" as used herein can be considered to be relative terms where the former term has a higher value than the latter term.

Similar steps to those described with reference to FIG. 7 for the first row are used to create the last row 423 of the de-noised image 320 from the last row 421 of the noisy image 201 by the noise reduction or de-noising process 422 of the last row (FIG. 5) according to an embodiment of the invention.

Similar steps to those described with reference to FIG. 7 for the rows are also used to create the columns of the de-noised image from the columns of the de-noised image 320 by applying the noise reduction or de-noising process to the columns (FIG. 6) according to an embodiment of the invention. These steps are described with reference to FIG. 8 for a first column in the input noisy image 201.

Figure 8:
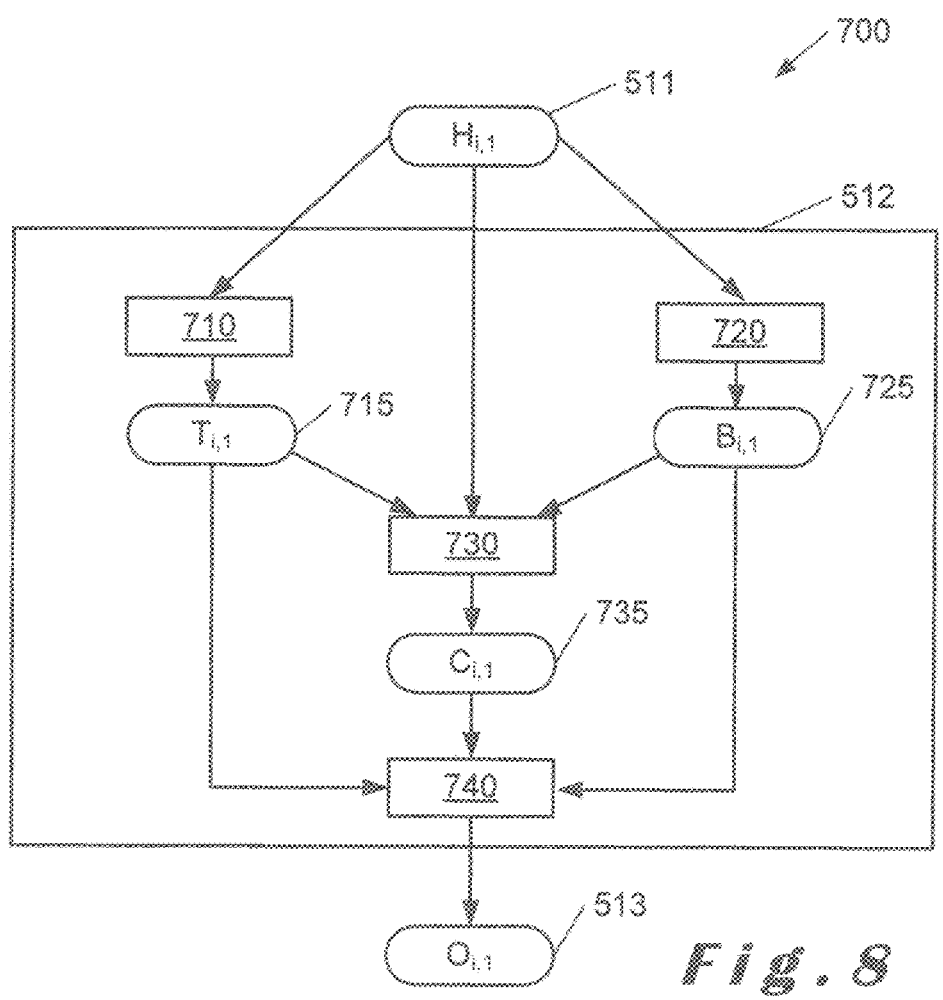
FIG. 8 illustrates a flow chart showing steps for noise reduction of a first column of the array shown in FIG. 3 but using the de-noised signal or image for the horizontal coordinates as the input signal or image.

In FIG. 8, a flow chart 700 is shown which illustrates the steps for creating the first column 513 of the de-noised image, $O_{i,1}$, from the first column 511 of the de-noised image, $H_{i,1}$, for the horizontal coordinates using a noise reduction or de-noising process 512 for the first column according to an embodiment of the invention. The first column 511 of the de-noised image, $H_{i,1}$, is an input for a top-down noise reduction or de-noising process 710, which generates a top-down de-noised first column 715, $T_{i,1}$. The first column 511 of the de-noised image, $H_{i,1}$, is also an input for a bottom-up de-noising 720, which generates a bottom-up de-noised first column 725, $B_{i,1}$. A weight calculation process 730, which generates weights 735, $c_{i,1}$, for the first column may use as inputs the first column 511 of the de-noised image, $H_{i,1}$, the top-down de-noised first column 715, $T_{i,1}$, and the bottom-up de-noised first column 725, $B_{i,1}$.

It will be appreciated that the weight calculation process 730 may use inputs other than the first column 511 of the de-noised image, $H_{i,1}$, the top-down de-noised first column 715, $T_{i,1}$, and the bottom-up de-noised first column 625, $B_{i,1}$, in accordance with a particular implementation of the present invention.

The top-down de-noised first column 715, $T_{i,1}$, the bottom-up de-noised first column 625, $B_{i,1}$, and the weights 735, $c_{i,1}$, for the first column are inputs for a weighted averaging process 740, which generates the first column 513 of the de-noised image, $O_{i,j}$.

In an embodiment of the invention, the top-down noise reduction or de-noising process 710 is performed with a first order auto-regressive filtering technique. The first element of the top-down de-noised first column 715, $T_{1,1}$, is given a value, which may be equal to the value of the de-noised signal for the horizontal coordinate at that point, $H_{1,1}$, an average of the de-noised signal over the first two points $(H_{1,1}+H_{2,1})/2$ or any other suitable value. For i, where i is an integer between 2 and m, the $i^{th}$ element of the top-down de-noised first column 715, $T_{i,1}$, is computed as $$T_{i,1}=(1-a_T)H_{i,1}+a_T T_{(i-1),1} \quad (4)$$

where $a_T$ is a positive number in the range from 0 to 1, and including both 0 and 1, and $T_{(i-1),1}$ is the $(i-1)^{th}$ element of the top-down de-noised first column 715. Higher order auto-regressive filtering techniques may also implemented depending on the particular implementation of the present invention.

In an embodiment of the invention, the bottom-up noise reduction or de-noising process 720 is also performed with an auto-regressive filtering technique. The last element of the bottom-up de-noised first column 725, $B_{m,1}$, is given a value, which may be equal to the value of the de-noised signal for the horizontal coordinate at that point, $H_{m,1}$, or an average of the de-noised signal for the horizontal coordinates over the last two points $(X_{m,1}+X_{(m-1),1})/2$ or any other suitable value. For i, taking all integer values from (m−1) to 1, the $i^{th}$ element of the bottom-up de-noised first column 725, $B_{i,1}$, is computed as $$B_{i,1}=(1-a_B)H_{i,1}+a_B B_{(i+1),1} \quad (5)$$

where $a_B$ is a positive number in the range from 0 to 1, and including both 0 and 1, and $B_{(i+1),1}$ is the $(i+1)^{th}$ element of the bottom-up de-noised first column 725. In one embodiment, $a_B$ may be equal to $a_T$.

It will be readily appreciated that many de-noising techniques, especially auto-regressive filtering techniques in which the output of the noise reduction or de-noising process at a point depends on the value of the signal at that point and on the output of the noise reduction or de-noising process at previously processed points, may be applied for the top-down noise reduction or de-noising process and the bottom-up noise reduction or de-noising process.

In an embodiment of the invention, the weight calculation process 730 for the determination of the weights 735 is such that the value of the weight at a point depends on the presence of an edge in a neighbourhood of this point. If an edge is detected below a point, then the weight for this point is significant. Similarly, if an edge is detected above a point, then the weight for this point is such that the influence of the top-down signal with respect to the bottom-up signal is less significant.

The number of weights 735 for the first column is equal to the number of elements of the first column, that is, m. The weights are used to weight the contributions of the top-down de-noised first column 715 and the bottom-up de-noised first column 725 in the first column 513 of the de-noised image 320 for the horizontal coordinates. The weighted averaging process 740 that may be written as $$O_{i,1}=c_{i1}T_{i1}+(1-c_{i1})B_{i1} \quad (6)$$

The top-down de-noised first column 715, $T_{i,1}$, can therefore be seen as a first component of de-noised signal and the bottom-up de-noised first column 725, $B_{i,1}$, can therefore be seen as a second component of de-noised signal, the de-noised signal being here the first column 513 of the de-noised image, $O_{i,1}$.

In an embodiment of the invention, if an edge is detected above a point, then the top-down de-noised signal is favoured in the weighted averaging process to provide a large value for $c_{i,1}$ for that point. Similarly, if an edge is detected below a point, then the bottom-up de-noised signal is favoured in the weighted averaging process to provide a small value for $c_{i,1}$ for that point.

Similar steps to those described with reference to FIG. 8 for the first column are used to create the last column 523 of the de-noised output image 201 (FIG. 6) from the last column 521 of the de-noised image 320 for the horizontal coordinates by applying the noise reduction or de-noising process 522 to the last column (FIG. 6) according to an embodiment of the invention.

Returning now to FIG. 7, a first embodiment of weight calculation process 630 will be described. The weight calculation process 630 generates edge-depending weights and includes calculating, for each pixel (1,j) of the first row except for the first pixel corresponding to j=1, a left edge intensity, $E_{1,j}$, such as $$E_{1,j}=|X_{1,j}-L_{1,(j-1)}| \quad (7)$$

The left edge intensity, $E_{1,j}$, is high at a point if an edge is present to the left of that point. The left edge intensity for the first point is set to 0, that is, $E_{1,1}=0$.

Similarly, a right edge intensity, $F_{1,j}$, is calculated for each pixel of the first row but the last pixel corresponding to j=n such as $$F_{1,j}=|X_{1,j}-R_{1,(j+1)}| \quad (8)$$

The right edge intensity, $F_{1,j}$, is high at a point if an edge is present at the right of this point. The right edge intensity for the last point is set to 0, that is, $F_{1,n}=0$.

Then, the weights, $b_{1,j}$, for the first row are calculated as $$b_{1,j}=F_{1,j}/(E_{1,j}+F_{1,j}) \quad (9)$$

The first row 413 of the de-noised image 320 for the horizontal coordinate is calculated as $$H_{1,j}=F_{1,j}L_{1,j}/(E_{1,j}+F_{1,j})+E_{1,j}R_{1,j}/(E_{1,j}+F_{1,j}) \quad (10)$$

where j is an integer value from 1 to n. If an edge is present at the left of a point, the weight of the left contribution to this point is small, while the weight of the right contribution is high. Similarly, if an edge is present at the right of a point, the weight of the right contribution to this point is small, while the weight of the left contribution is high.

In a variation of this embodiment, the left edge intensity $E_{1,j}$ is calculated as $$E_{1,j}=|L_{1,j}-L_{1,(j-1)}| \text{ for } j=2 \text{ to } n \quad (11)$$

and the right edge intensity $F_{1,j}$ is calculated as $$F_{1,j}=|R_{1,j}-R_{1,(j+1)}| \text{ for } j=(n-1) \text{ to } 1 \quad (12)$$

In another variation of this embodiment, the left edge intensity, $E_{1,j}$, is calculated as $$E_{1,j}=|X_{1,j}-X_{1,(j-1)}| \text{ for } j=2 \text{ to } n \quad (13)$$

and the right edge intensity, $F_{1,j}$, is calculated as $$F_{1,j}=|X_{1,j}-X_{1,(j+1)}| \text{ for } j=(n-1) \text{ to } 1 \quad (14)$$

In another embodiment of the weight calculation process 630, the generation of edge-dependent weights includes calculating, for each pixel (1,j) of the first row except the first pixel, a left edge intensity, $E_{1,j}$, as described in equation (7) above where $E_{1,1}$ is set to 0, and, a right edge intensity, $F_{1,j}$, for each pixel of the first row except the last pixel as described in equation (8) above where $F_{1,n}$ is set to 0.

The left edge intensity, $E_{1,j}$, and right edge intensity, $F_{1,j}$, are then de-noised, for example, by an auto-regressive filter that calculates a de-noised left edge intensity, $DE_{1,j}$, and a de-noised right edge intensity, $DF_{1,j}$:

$$DE_{1,j}=(1-a_E)E_{1,j}+a_E DE_{1,(j-1)} \text{ for } j=2 \text{ to } n \quad (15)$$

$$DF_{1,j}=(1-a_F)F_{1,j}+a_F DF_{1,(j+1)} \text{ for } j=(n-1) \text{ to } 1 \quad (16)$$

where $a_E$ and $a_F$ are positive numbers in the range from 0 to 1, and including both 0 and 1, where $DE_{1,1}$ and $DF_{1,n}$ are set equal to 0. $a_E$ and $a_F$ may be equal to each other in one embodiment, and, in another embodiment, they may have different values.

Then, the weights for the first row, $b_{1,j}$, are calculated as $$b_{1,j}=DF_{1,j}/(DE_{1,j}+DF_{1,j}) \text{ for } j=1 \text{ to } n \quad (17)$$

The first row 413 of the de-noised image for the horizontal coordinate is calculated as $$H_{1,j}=DF_{1,j}L_{1,j}/(DE_{1,j}+DF_{1,j})+DE_{1,j}R_{1,j}/(DE_{1,j}+DF_{1,j}) \quad (18)$$

Again, if an edge is present at the left of a point, the weight of the left contribution to this point is low, while the weight of the right contribution is high. Similarly, if an edge is present at the right of a point, the weight of the right contribution to this point is low, while the weight of the left contribution is high.

In an embodiment of the invention, if $DE_{1,j}$ and $DF_{1,j}$ are both equal to 0 at a given point (i,j), the value of the de-noised image for the horizontal coordinate $H_{i,j}$ is set equal to the value of signal $X_{i,j}$ at that point.

In an embodiment of the invention, a similar weight calculation process to the weight calculation process described above with reference to step 630 is used for all the rows of the input image 201 (FIG. 3).

As visible in the equations, the weights, $b_{i,j}$, are normalised in such a way that their sum is equal to 1, in order to match the scale of the de-noised signal to the scale of the noisy signal.

The weight calculation process 730 for the vertical coordinates can be performed in the same way as that described for the weight calculation process 630 for the horizontal coordinates.

In an alternative embodiment, a different weight calculation process or no weight calculation may be performed for the vertical coordinates.

In an alternative embodiment of the invention, an edge detection technique is applied and the position of the detected edges is used to compute the weights $b_{i,j}$ and $(1-b_{i,j})$ of the contributions of the two directions. If not edge is detected in a neighbourhood of a point, the weights are both close to 0.5.

To make the noise reduction or de-noising process faster, in an embodiment of the invention, it is necessary to reduce the number of computational steps, for example, by minimising the number of loops that the noise reduction or de-noising process requires.

Figure 9:
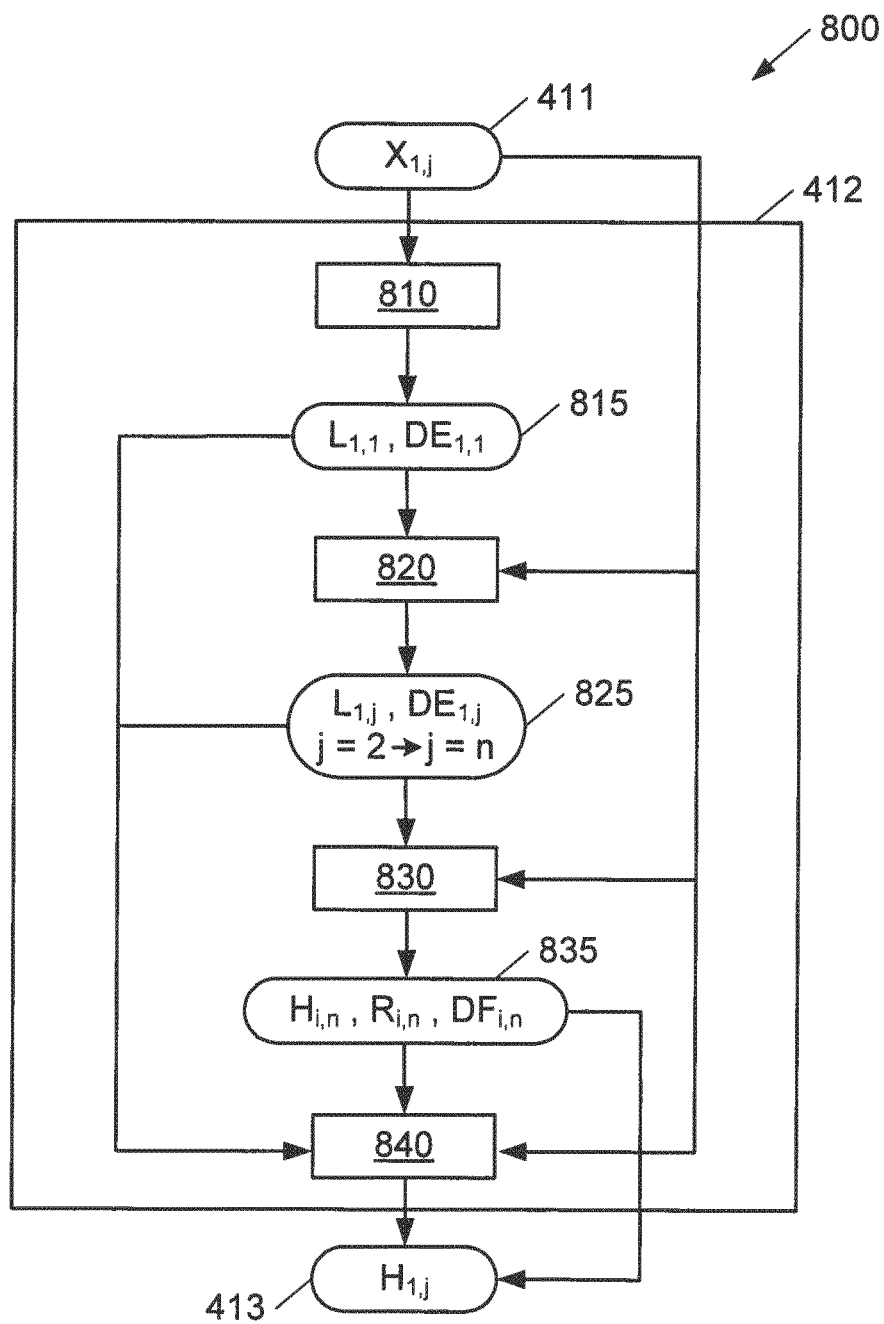
FIG. 9 is similar to FIG. 7 but illustrating an alternative noise reduction process for the first row of the array.

FIG. 9 illustrates a flow chart 800 which illustrates an alternative process as described above with reference to FIG. 7 in which the number of steps and the number of loops required to perform the noise reduction or de-noising process 412 of the first row are reduced.

Starting from the first row 411 of the noisy image, $X_{1,j}$, the first point of the row (j=1) is processed, in step 810, to generate values 815 for the first point of a value for the left-to-right de-noised first row, $L_{1,1}$, and a value for the left edge intensity, $DE_{1,1}$ at the same time.

Step 810 sets the values of the left-to-right de-noised image for the first element in the first row, $L_{1,1}$, equal to the value of the first element in the first row in the input image, $X_{1,1}$, and sets the value of the de-noised left edge intensity for the first element in the first row, $DE_{1,1}$, to 0.

Then, a forward loop 820 is performed, which uses, as inputs, the first row 411 of the noisy image, $X_{1,j}$, and the values 815, namely, the value at the first point of the left-to-right de-noised first row, $L_{1,1}$, and the value at the first point of the left edge intensity, $DE_{1,1}$. The forward loop 820 generates values 825 for a left-to-right de-noised first row, $L_{1,j}$, and a left edge intensity, $DE_{1,j}$, for values of j between 2 and n.

Step 820 is a loop on integer values of j between 2 and n. The left-to-right de-noised first row, $L_{1,j}$, is computed as $$L_{1,j}=(1-a_L)X_{1,j}+a_L L_{1,(j-1)} \quad (19)$$

where $a_L$ is a positive number in the range from 0 to 1, and including both 0 and 1. The left edge intensity, $E_{1,j}$, is computed as $$E_{1,j}=|X_{1,j}-L_{1,(j-1)}| \quad (20)$$

and the de-noised left edge intensity, $DE_{1,j}$, is computed as $$DE_{1,j}=(1-a_E)E_{1,j}+a_E DE_{1,(j-1)} \quad (21)$$

where $a_E$ is a positive number in the range from 0 to 1, and including both 0 and 1.

Step 830 comprises setting the de-noised right intensity value for the first row, $DF_{1,n}$, equal to 0; the right-to-left de-noised value for the first row, $R_{1,n}$, equal to the input value for the first row, $X_{1,n}$; and the de-noised value for for the first row, $H_{1,n}$, equal to the left-to-right de-noised value for the first row, $L_{1,n}$. Alternatively, the de-noised value for first row, $H_{1,n}$, may be set equal to the input value for the first row, $X_{1,n}$.

The last point of the row (j=n) is considered at step 830 which generates values 825 for the last point of the right-to-left de-noised first row, $R_{1,n}$, the last point of the right edge intensity, $DF_{1,n}$, and the last point of the first row of the image de-noised for the horizontal coordinate, $H_{1,n}$. Step 830 uses as inputs the first row 411 of the noisy image, $X_{1,j}$, the left-to-right de-noised first row, $L_{1,j}$, and the left edge intensity $DE_{1,j}$ for values of j between 2 and n as determined in forward loop 820. The output 835 from step 830 comprises values relating to the de-noised image for the last row, $H_{1,n}$, the right-to-left de-noised image for the last row, $R_{1,n}$, and the de-noised right edge intensity for the last row, $DF_{1,n}$.

A backward loop is performed at step 840, which uses as inputs the first row value 411, $X_{1,j}$; the values 815 for the left-to-right de-noised value for the first element, $L_{1,1}$, and the edge intensity for the first element, $DE_{1,1}$; the values 825 for the left-to-right de-noised value for the first row, $L_{1,j}$, and the left edge intensity for the second to last element of the first row (that is, where j is between 2 and n), $DE_{1,j}$; and the values 835 for the right-to-left de-noised first row, $R_{1,n}$, the left edge intensity for the first row, $DE_{1,n}$, and the de-noised first row, $H_{1,n}$.

Step 840 is a loop on integer values of j between (n−1) and 1. The right-to-left de-noised first row, $R_{i,j}$, is computed as $$R_{1,j}=(1-a_R)X_{1,j}+a_R R_{1,(j+1)} \quad (22)$$

where $a_R$ is a positive number in the range from 0 to 1, and including both 0 and 1. The right edge intensity, $F_{1,j}$, is computed as $$F_{1,j}=|X_{1,j}-R_{1,(j+1)}| \quad (23)$$

The de-noised right edge intensity is computed as $$DF_{1,j}=(1-a_F)F_{1,j}+a_F DF_{1,(j+1)} \quad (24)$$

where $a_F$ is a positive number in the range from 0 to 1, and including both 0 and 1.

The first row 413 of the de-noised image for the horizontal coordinate, $H_{1,j}$, is determined from the output from the backward loop 840 and the output from the step 830, that is, the values 835 for the right-to-left de-noised first row, the left edge intensity for the first row, $DE_{1,n}$, and the de-noised first row, $H_{1,n}$.

The first row 413 of the de-noised image for the horizontal coordinate, $H_{1,j}$, is computed in the backward loop as $$H_{1,j}=DF_{1,j}L_{1,j}/(DE_{1,j}+DF_{1,j})+DE_{1,j}R_{1,j}/(DE_{1,j}+DF_{1,j}) \quad (25)$$

and the first element of this first row 413 of the image de-noised for the horizontal coordinate, $H_{1,1}$, is taken from values 835 determined in step 830.

A process similar to that described with reference to FIG. 9 for providing the de-noised first row 412 can be used for noise reduction or de-noising process for all rows, including the noise reduction or de-noising process for the last row 422 (as described above with reference to FIG. 5).

Similarly, a process similar to that described with reference to FIG. 9 for providing the de-noised first row 412 can be used for the noise reduction or de-noising process of the columns, including the noise reduction or de-noising process of the first column 512 and the noise reduction or de-noising process for the last column 522 (as described above with reference to FIG. 6).

Figure 10:
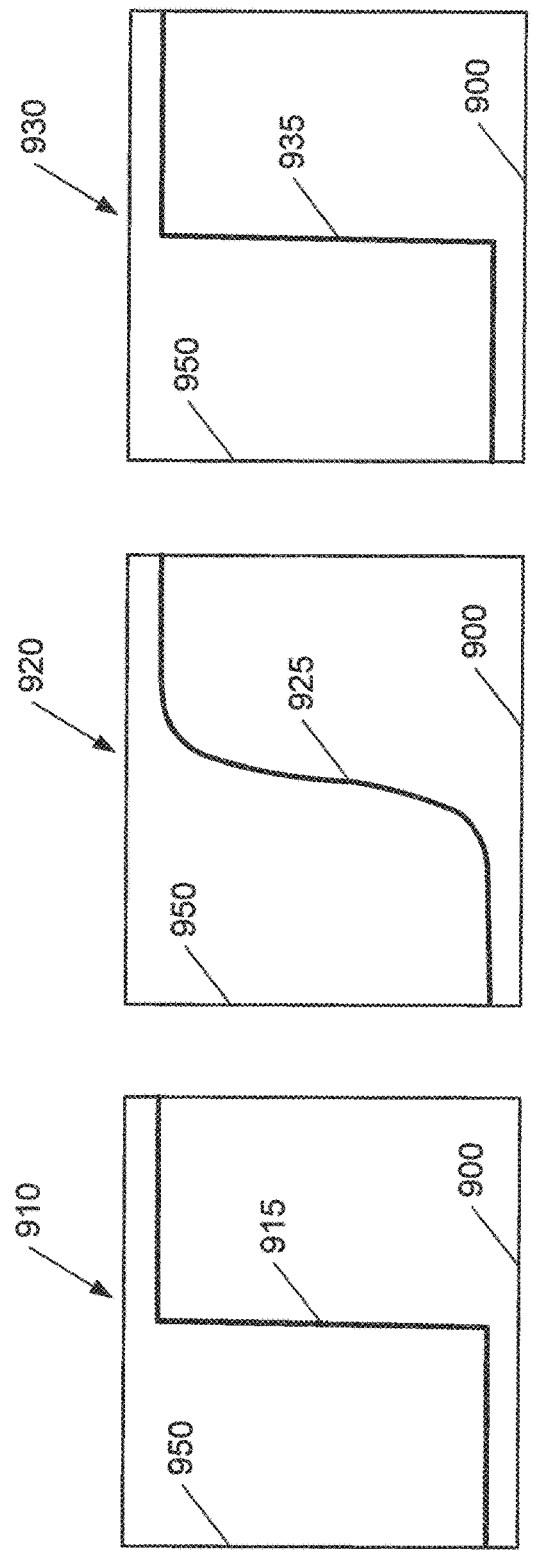
FIG. 10 illustrates a comparison for the noise reduction method of the present invention with the prior art.

FIG. 10 illustrates a comparison between an auto-regressive filtering technique according to the prior art and an auto-regressive filtering according to an embodiment of the invention. A first frame 910 shows an input signal 915, which corresponds to the noisy signal 101 (FIG. 2). The input signal 915 has a value on a signal axis 950 (or y-axis) which depends on a signal coordinate represented by a coordinate axis (or x-axis) 900. In this example, the input signal is not noisy and presents an edge at a precise point as indicated by the vertical transition between two signal levels at a particular value, i.

A second frame 920 shows the result of a first-order auto-regressive filtering according to the prior art using the equations $$L(1)=X(1)$$

$$R(m)=X(m)$$

$$L(i)=0.8X(i)+0.2L(i-1) \text{ for } i=2 \text{ to } m$$

$$R(i)=0.8X(i)+0.2R(i+1) \text{ for } i=(m-1) \text{ to } 1$$

$$O(i)=(L(i)+R(i))/2 \text{ for } i=1 \text{ to } m$$

where i is an index or point along the x-axis from 1 to m, m being the last value of i on the x-axis. The edge is now distributed over several points along the x-axis, and is effectively smoothed and is no longer sharp.

A third frame 930 shows the result a first-order auto-regressive filtering according to the present invention using the equations $$L(1)=X(1)$$

$$R(m)=X(m)$$

$$L(i)=0.8X(i)+0.2L(i-1) \text{ for } i=2 \text{ to } m$$

$$R(i)=0.8X(i)+0.2R(i+1) \text{ for } i=(m-1) \text{ to } 1$$

$$E(1)=0$$

$$F(m)=0$$

$$E(i)=|X(i)-L(i-1)| \text{ for } i=2 \text{ to } m$$

$$F(i)=|X(i)-R(i+1)| \text{ for } i=(m-1) \text{ to } 1$$

$$b(i)=F(i)/(E(i)+F(i)) \text{ for } i=1 \text{ to } m$$

$$O(i)=b(i)L(i)+(1-b(i))R(i) \text{ for } i=1 \text{ to } m$$

If $E(i)=F(i)=0$ for a point i, then $O(i)=X(i)$ for that point. Here, the edge is aligned with respect to the point, i, and is still very sharp.

Figure 11:
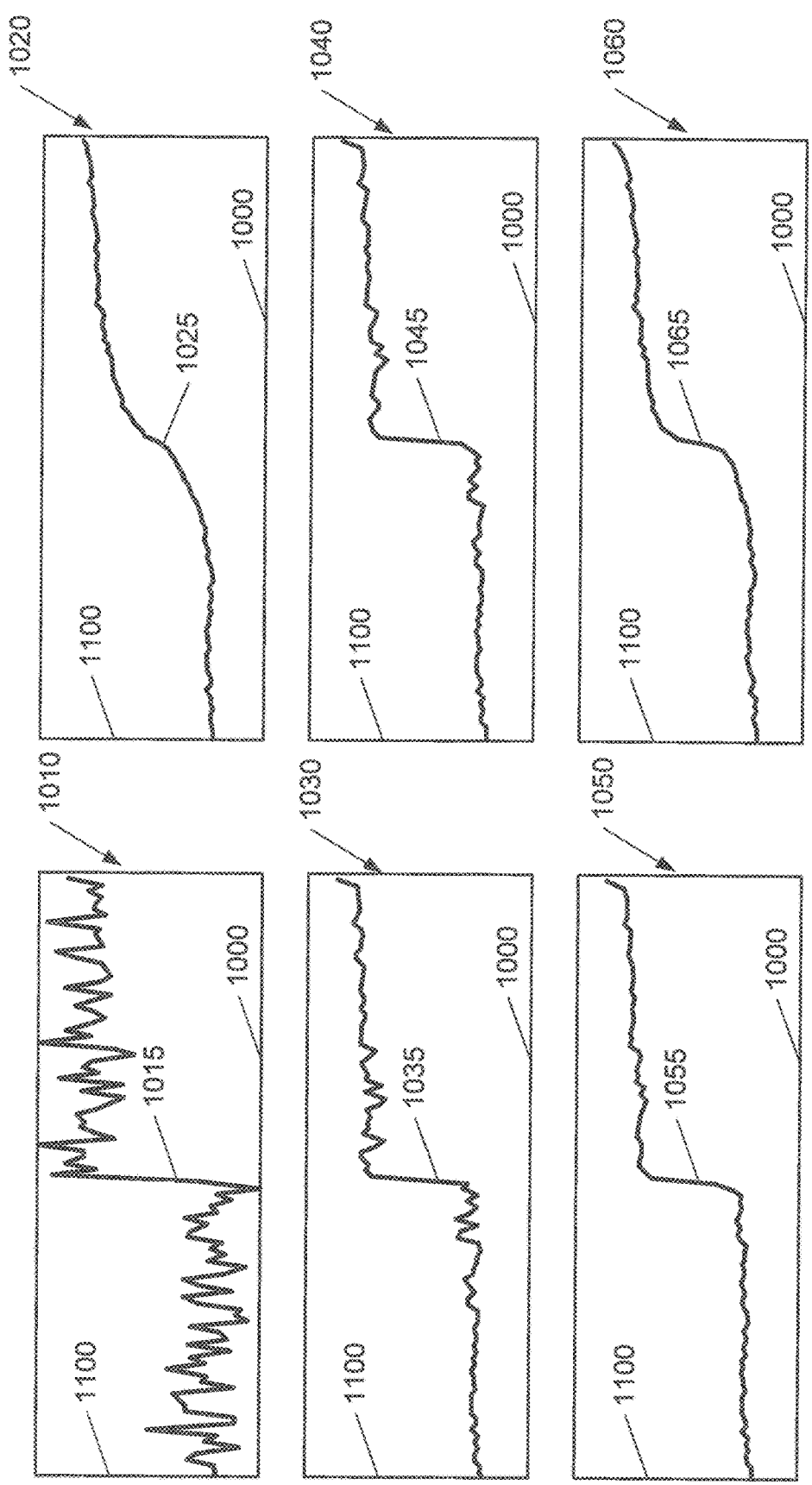
FIG. 11 illustrates an input signal or image together with a comparison of conventional noise reduction and the noise reduction process of present invention.

FIG. 11 illustrates a further comparison between an auto-regressive filtering according to the prior art and auto-regressive filtering according to an embodiment of the invention. A first frame 1010 shows an input signal 1015, which corresponds to the noisy signal 101 (FIG. 2). The input signal 1015 has a value on a signal axis 1050 which depends on a signal coordinate represented by a coordinate axis (x-axis) 1000. In this example, the input signal is noisy and includes an edge.

A second frame 1020 shows the result of a first-order auto-regressive filtering according to the prior art using the equations $$L(1)=X(1)$$

$$R(m)=X(m)$$

$$L(i)=0.9X(i)+0.1L(i-1) \text{ for } i=2 \text{ to } m$$

$$R(i)=0.9X(i)+0.1R(i+1) \text{ for } i=(m-1) \text{ to } 1$$

$$O(i)=(L(i)+R(i))/2 \text{ for } i=1 \text{ to } m$$

where i is an index or point along the x-axis from 1 to m, where m is the last value of i on the x-axis. The noise is reduced with the edge being spread out along the x-axis.

Frames 1030, 1040, 1050 and 1060 show the results of first-order auto-regressive filtering processes according to the present invention using the equations $$L(1)=X(1)$$

$$R(m)=X(m)$$

$$L(i)=0.9X(i)+0.1L(i-1) \text{ for } i=2 \text{ to } m$$

$$R(i)=0.9X(i)+0.1R(i+1) \text{ for } i=(m-1) \text{ to } 1$$

$$E(i)=|X(i)-L(i-1)| \text{ for } i=2 \text{ to } m$$

$$F(i)=|X(i)-R(i+1)| \text{ for } i=(m-1) \text{ to } 1$$

$$DE(1)=0$$

$$DF(m)=0$$

$$DE(i)=\beta E(i)+(1-\beta)DE(i-1) \text{ for } i=2 \text{ to } m$$

$$DF(i)=\beta F(i)+(1-\beta)DF(i+1) \text{ for } i=(m-1) \text{ to } 1$$

$$b(i)=DF(i)/(DE(i)+DF(i)) \text{ for } i=1 \text{ to } m$$

$$O(i)=b(i)L(i)+(1-b(i))R(i) \text{ for } i=1 \text{ to } m$$

where i is an index or point along the x-axis from 1 to m, where m is the last value of i along the x-axis.

If $DE(i)=DF(i)=0$ for a value of i, then $O(i)=X(i)$ for that point. Frames 1030, 1040, 1050 and 1060 respectively illustrate the de-noised signals 1035, 1045, 1055 and 1075 which correspond with respective values of $\beta$ equal to 0, 0.4, 0.7 and 0.95. The edge is relatively sharp, the edge being sharper for some values of $\beta$, with associated reductions in noise.

Comparing frame 1020 (prior art) and frame 1060 (embodiment of the invention with a value of $\beta$ of 0.95), the level of noise is similar while the edge is sharper at frame 1060 (embodiment of the invention) than at frame 1020 (prior art).

In an embodiment of the invention, points or ranges of points where the signal is de-noised are selected before the noise reduction or de-noising process and the noise reduction or de-noising process is performed only on those selected points or ranges of points.

It will be appreciated that, although the present invention is mainly described using a two-dimensional noise reduction or de-noising process 202 (FIG. 4) for which a noise reduction or de-noising process 310 for the horizontal coordinates is performed before a noise reduction or de-noising process 330 for the vertical coordinates, in some embodiments, the two-dimensional noise reduction or de-noising process 202 may start with the noise reduction or de-noising process for the vertical coordinates followed by the noise reduction or de-noising process for the horizontal coordinates.

It will be appreciated that, although the present invention is mainly described with reference to two-dimensional signals (or images) having two coordinates, in some embodiments, the present invention may be used for multi-dimensional signals having more than two coordinates. Moreover, the present invention may also be used for signals having a single coordinate.

A colour image in the red-green-blue (RGB) domain is the combination of three signals, each of the three signals corresponding to a respective colour intensity in red, green and blue. If the image to be de-noised is an RGB-D image (where D refers to a depth value), including four signals (red signal, green signal, blue signal and depth signal) as function of two coordinates, the invention can be used successively for each signal or computational steps can be grouped to process all signals in one direction for a first coordinate followed by all signals in the other direction for the first coordinate; then process all signals in one direction for a second coordinate followed by all signals in the second direction of the second coordinate.

The present invention has been described with reference to noise reduction or de-noising processes for intensity values of a point in a two-dimensional Cartesian coordinate system but can readily be extended to noise reduction or de-noising processes for a point in a three-dimensional Cartesian coordinate system. In such a system, the intensity values may correspond to depth values associated with each point positioned in two-dimensional space, for example, an array.

It will be appreciated that, although the present invention is mainly described using a two-dimensional Cartesian coordinate system, it may be used for other coordinate systems, for example, polar, circular and spherical coordinate systems.

The invention claimed is:

1. A method for decreasing noise from an input signal to generate a de-noised signal, the input signal comprising an intensity which is a function of at least one coordinate, the method comprising the steps of:
   a) applying a first noise reduction process to the input signal in a first direction along a first coordinate to generate a first component of the de-noised signal;
   b) applying a second noise reduction process to the input signal in a second direction along the first coordinate to generate a second component of the de-noised signal, the first and second directions being opposite to one another;
   c) detecting the presence of an edge in signal intensity in the input signal within a neighbourhood of a given point and averaging at least the first and second components to generate a de-noised signal; and
   d) applying a weighting to at least one of the first and second components if an edge is detected at the given point, the weighting being adjusted in accordance with to which side of the given point the detected edge lies; and applying a same weighting to each of the first and second components if no edge is detected at the given point.

2. A method according to claim 1, wherein step c) further comprises giving more weight to one of the first and second components than to the other one of the first and second components when the detected edge is on the side of the point opposite to the one of the first and second components.

3. A method according to claim 1, wherein step d) further comprises determining the weighting at a given point at which the input signal has an intensity in accordance with signal intensity in the input signal in the neighbourhood of the given point.

4. A method according to claim 1, wherein step d) further comprises determining the weighting at a given point at which the input signal has an intensity in accordance with a variation in signal intensity in the input signal in the neighbourhood of the given point.

5. A method according to claim 1, wherein, for at least one point, increasing a contribution of the first component to the weighting in accordance with an absolute value of the difference between an intensity of the input signal at the point and an intensity of the second component at another point further along the first coordinate.

6. A method according to claim 1, wherein, for at least one point, increasing a contribution of the second component to the weighting in accordance with an absolute value of the difference between an intensity of the input signal at the point and the intensity of the first component at a previous point along the first coordinate.

7. A method according to claim 1, wherein the first and second noise reduction processes are performed by auto-regressive filtering techniques.

8. A method according to claim 1, further comprising applying a noise reduction process to at least one weighting for the first and second components.

9. A method according to claim 8, wherein the noise reduction process for the at least one weighting is performed by an auto-regressive filtering technique.

10. A method for decreasing noise from an input signal to generate a de-noised signal for first and second coordinates, the input signal comprising an intensity which is a function of at least the first coordinate and the second coordinate wherein the method comprises:
   decreasing noise from the input signal with respect of the first coordinate to generate a first coordinate de-noised signal by:
      a) applying a first noise reduction process to the input signal in a first direction along the first coordinate to generate a first component of the de-noised signal;
      b) applying a second noise reduction process to the input signal in a second direction along the first coordinate to generate a second component of the de-noised signal, the first and second directions being opposite to one another;
      c) detecting the presence of an edge in signal intensity in the input signal within a neighbourhood of a given point and averaging at least the first and second components to generate a de-noised signal; and
      d) applying a first weighting to at least one of the first and second components if an edge is detected at the given point, the first weighting being adjusted in accordance with to which side of the given point the detected edge lies; and applying a same first weighting to each of the first and second components if no edge is detected at the given point; and
   decreasing noise from the input signal with respect of the second coordinate by:
      i) applying a third noise reduction process on the first coordinate de-noised signal to generate a first component of the de-noised signal for the first and second coordinates;
      ii) applying a fourth noise reduction process on the first coordinate de-noised signal to generate a second component of the de-noised signal for the first and second coordinates; and
      iii) averaging the first and second components for the first and second coordinates to generate a de-noised signal for the first and second coordinates, the averaging of the first and the second components for the first and second coordinates comprising applying a second weighting.

11. A method according to claim 10, wherein the input signal comprises a depth map, and the first and second coordinates respectively comprise a horizontal coordinate and a vertical coordinate.

12. An interactive computerised system comprising:
   an imaging system for capturing at least one image of a scene within its frustum; and
   a computerised system associated with the imaging system, the computerised system including at least one processor configured for processing an image of the scene captured by the imaging system in accordance with steps of:
      i) applying a first noise reduction process to the image in a first direction along a first component to generate a first component of a de-noised image signal;
      ii) applying a second noise reduction process to the image in a second direction along the first component to generate a second component of the de-noised image signal; and
      iii) detecting the presence of an edge in signal intensity in the image within a neighbourhood of a given point and averaging at least the first and second components to generate a de-noised image signal;
      iv) applying a weighting to at least one of the first and second components if an edge is detected at the given point, the weighting being adjusted in accordance with to which side of the given point the detected edge lies; and applying a same weighting to each of the first and second components if no edge is detected at the given point.

13. A system according to claim 12, wherein the imaging system comprises a depth sensing imaging system.

14. A non-transitory computer readable medium storing a program, which when executed by a computer, performs steps of:
   i) applying a first noise reduction process to a signal in a first direction along a first component to generate a first component of a de-noised signal;
   ii) applying a second noise reduction process to the signal in a second direction along the first component to generate a second component of the de-noised signal; and
   iii) detecting the presence of an edge in signal intensity in the signal within a neighbourhood of a given point and averaging at least the first and second components to generate a de-noised signal;
   iv) applying a weighting to at least one of the first and second components if an edge is detected at the given point, the weighting being adjusted in accordance with to which side of the given point the detected edge lies; and applying a same weighting to each of the first and second components if no edge is detected at the given point.

15. A non-transitory computer readable medium according to claim 14, wherein programming instructions are grouped in order to minimise the number of computational loops.

16. The method of claim 10, wherein the first noise reduction process and the third noise reduction process are a first same noise reduction process.

17. The method of claim 16, wherein the second noise reduction process and the fourth noise reduction process are a second same noise reduction process.

* * * * *